US008688449B2

(12) United States Patent
Miyazaki

(10) Patent No.: US 8,688,449 B2
(45) Date of Patent: Apr. 1, 2014

(54) WEIGHT COEFFICIENT GENERATION DEVICE, VOICE RECOGNITION DEVICE, NAVIGATION DEVICE, VEHICLE, WEIGHT COEFFICIENT GENERATION METHOD, AND WEIGHT COEFFICIENT GENERATION PROGRAM

(75) Inventor: Toshiyuki Miyazaki, Tokyo (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 342 days.

(21) Appl. No.: 13/129,169

(22) PCT Filed: Nov. 17, 2009

(86) PCT No.: PCT/JP2009/069476
§ 371 (c)(1),
(2), (4) Date: May 13, 2011

(87) PCT Pub. No.: WO2010/061751
PCT Pub. Date: Jun. 3, 2010

(65) Prior Publication Data
US 2011/0231191 A1    Sep. 22, 2011

(30) Foreign Application Priority Data
Nov. 25, 2008   (JP) .................................. 2008-299220

(51) Int. Cl.
*G10L 15/10*    (2006.01)
(52) U.S. Cl.
USPC .......................................... 704/242; 704/270
(58) Field of Classification Search
USPC ......................................... 704/231–257, 270
See application file for complete search history.

(56) References Cited

U.S. PATENT DOCUMENTS

| 5,787,395 | A | * | 7/1998 | Minamino | .................... | 704/255 |
| 2004/0083108 | A1 | * | 4/2004 | Tachimori et al. | ............. | 704/270 |
| 2007/0233485 | A1 | * | 10/2007 | Hitotsumatsu et al. | ........ | 704/251 |
| 2008/0091412 | A1 | * | 4/2008 | Strope et al. | .................... | 704/10 |
| 2009/0306989 | A1 | | 12/2009 | Kaji | | |
| 2010/0305947 | A1 | * | 12/2010 | Schwarz et al. | .............. | 704/252 |

FOREIGN PATENT DOCUMENTS

| JP | 08-202387 | 8/1996 |
| JP | 11-024695 | 1/1999 |

(Continued)

OTHER PUBLICATIONS

European Search Report dated Oct. 26, 2012 for corresponding application No. EP09828999.4.

*Primary Examiner* — Abul Azad
(74) *Attorney, Agent, or Firm* — Morgan, Lewis & Bockius LLP

(57) ABSTRACT

A weight coefficient generation device, a speech recognition device, a navigation system, a vehicle, a vehicle coefficient generation method, and a weight coefficient generation program are provided for the purpose of improving a speech recognition performance of place names. In order to address the above purpose, an address database 12 has address information data items including country names, city names, street names, and house numbers, and manages the address information having a tree structure indicating hierarchical relationships between the place names from wide area to a narrow area. Each of the place names stored in the address database 12 is taken as a speech recognition candidate. A weight coefficient calculation unit 11 of a weight coefficient generation device 10 calculates a weight coefficient of the likelihood of the aforementioned recognition candidate based on the number of the street names belonging to the lower hierarchy below the city names.

4 Claims, 9 Drawing Sheets

(56) References Cited

FOREIGN PATENT DOCUMENTS

| JP | 11-231889 | 8/1999 |
| JP | 2003-150189 | 5/2003 |
| JP | 2004-117063 | 4/2004 |
| JP | 2004-240244 | 8/2004 |
| JP | 2006-163285 | 6/2006 |
| WO | 2007/114226 | 10/2007 |

* cited by examiner

FIG. 3

| COUNTRY NAME | PHONETIC SYMBOL | PLACE NAME ID | CITY NAME | PHONETIC SYMBOL | PLACE NAME ID | STREET NAME | PHONETIC SYMBOL | PLACE NAME ID | HOUSE NUMBER | PHONETIC SYMBOL | PLACE NAME ID |
|---|---|---|---|---|---|---|---|---|---|---|---|
| France | xxx | 1 | Paris | xxx | 2 | Avenue de la Asa | xxx | 5 | 1 | xxx | 15 |
| | | | | | | | | | ... | ... | ... |
| | | | | | | Rue Miyazalc | xxx | 6 | 1 | xxx | 20 |
| | | | | | | | | | ... | ... | ... |
| | | | | | | IL Highway 1 Highway | xxx | 7 | 1 | xxx | 25 |
| | | | | | | | | | ... | ... | ... |
| | | | | | | Rue D'Avron | xxx | 8 | 1 | xxx | 30 |
| | | | | | | | | | ... | ... | ... |
| | | | Marseille | xxx | 3 | Av. du Prado | xxx | 9 | 1 | xxx | 40 |
| | | | | | | | | | ... | ... | ... |
| | | | | | | rue Beauvau | xxx | 10 | 1 | xxx | 44 |
| | | | | | | | | | ... | ... | ... |
| | | | | | | Rue Reine-Eliasbeth | xxx | 11 | 1 | xxx | 50 |
| | | | | | | | | | ... | ... | ... |
| | | | Nice | xxx | 4 | Av. Notre Dame | xxx | 12 | 1 | xxx | 60 |
| | | | | | | | | | ... | ... | ... |
| | | | | | | Av. Marechal Foch | xxx | 13 | 1 | xxx | 63 |
| | | | | | | | | | ... | ... | ... |
| | | | | | | Rue Assalit | xxx | 14 | 1 | xxx | 67 |
| | | | | | | | | | ... | ... | ... |

FIG. 4

| COUNTRY NAME | PHONETIC SYMBOL | PLACE NAME ID | CITY NAME | PHONETIC SYMBOL | PLACE NAME ID | FACILITY GENRE | PHONETIC SYMBOL | PLACE NAME ID | FACILITY NAME | PHONETIC SYMBOL | PLACE NAME ID |
|---|---|---|---|---|---|---|---|---|---|---|---|
| JAPAN | xxx | 1 | TOKYO | xxx | 2 | PARK | xxx | 4 | PARK A | xxx | 10 |
| | | | | | | | | | ... | ... | ... |
| | | | | | | GAS STATION | xxx | 5 | STATION H | xxx | 20 |
| | | | | | | | | | STATION I | xxx | 21 |
| | | | | | | | | | STATION J | xxx | 22 |
| | | | | | | | | | ... | ... | ... |
| | | | | | | FAMILY RESTAURANT | xxx | 6 | RESTAURANT P | xxx | 40 |
| | | | | | | | | | RESTAURANT Q | xxx | 41 |
| | | | | | | | | | ... | ... | ... |
| | | | SAPPORO | xxx | 3 | PARK | xxx | 7 | PARK B | xxx | 60 |
| | | | | | | | | | ... | ... | ... |
| | | | | | | GAS STATION | xxx | 8 | STATION K | xxx | 67 |
| | | | | | | | | | STATION L | xxx | 68 |
| | | | | | | | | | ... | ... | ... |
| | | | | | | FAMILY RESTAURANT | xxx | 9 | RESTAURANT R | xxx | 77 |
| | | | | | | | | | ... | ... | ... |

FIG. 5

| CHARACTER DATA FOR DISPLAY | PLACE NAME ID | PHONETIC SYMBOL | PHONEME MODEL | WEIGHT COEFFICIENT |
|---|---|---|---|---|
| Paris | 5 | xxx | xxx | −1 |
| Marseille | 6 | xxx | xxx | 0 |
| Nice | 7 | xxx | xxx | −0.5 |

FIG. 6

| PLURAL CANDIDATES | RECOGNITION RATE (%) |
|---|---|
| RECOGNITION PERFORMANCE AT FIRST CANDIDATE | 68.9 |
| RECOGNITION PERFORMANCE UP TO SECOND CANDIDATE | 76.59 |
| RECOGNITION PERFORMANCE UP TO THIRD CANDIDATE | 80.94 |
| RECOGNITION PERFORMANCE UP TO FOURTH CANDIDATE | 84.28 |
| RECOGNITION PERFORMANCE UP TO FIFTH CANDIDATE | 86.62 |

FIG. 7

| PLURAL CANDIDATES | RECOGNITION RATE (%) |
|---|---|
| RECOGNITION PERFORMANCE AT FIRST CANDIDATE | 76.25 |
| RECOGNITION PERFORMANCE UP TO SECOND CANDIDATE | 84.07 |
| RECOGNITION PERFORMANCE UP TO THIRD CANDIDATE | 87.59 |
| RECOGNITION PERFORMANCE UP TO FOURTH CANDIDATE | 90.03 |
| RECOGNITION PERFORMANCE UP TO FIFTH CANDIDATE | 91.01 |

FIG. 9

| PLURAL CANDIDATES | RECOGNITION RATE (%) |
|---|---|
| RECOGNITION PERFORMANCE AT FIRST CANDIDATE | 83.61 |
| RECOGNITION PERFORMANCE UP TO SECOND CANDIDATE | 87.63 |
| RECOGNITION PERFORMANCE UP TO THIRD CANDIDATE | 90.97 |
| RECOGNITION PERFORMANCE UP TO FOURTH CANDIDATE | 92.64 |
| RECOGNITION PERFORMANCE UP TO FIFTH CANDIDATE | 92.98 |

FIG. 10

| PLURAL CANDIDATES | RECOGNITION RATE (%) |
|---|---|
| RECOGNITION PERFORMANCE AT FIRST CANDIDATE | 73.7 |
| RECOGNITION PERFORMANCE UP TO SECOND CANDIDATE | 82.7 |
| RECOGNITION PERFORMANCE UP TO THIRD CANDIDATE | 86.22 |
| RECOGNITION PERFORMANCE UP TO FOURTH CANDIDATE | 88.07 |
| RECOGNITION PERFORMANCE UP TO FIFTH CANDIDATE | 89.93 |

FIG. 11

| COUNTRY NAME | PHONETIC SYMBOL | PLACE NAME ID | FIRST HIER. | PHONETIC SYMBOL | PLACE NAME ID | SECOND HIER. | PHONETIC SYMBOL | PLACE NAME ID | THIRD HIER. | PHONETIC SYMBOL | PLACE NAME ID | FOURTH HIER. | PHONETIC SYMBOL | PLACE NAME ID | FIFTH HIER. | PHONETIC SYMBOL | PLACE NAME ID | SIXTH HIER. |
|---|---|---|---|---|---|---|---|---|---|---|---|---|---|---|---|---|---|---|
| JAPAN | xxx | 101 | HOKKAIDO | xxx | 101 | SAPPORO CITY | xxx | 200 | KITA KU | xxx | 500 | KITA 11 JYO NISHI ... | xxx | 700 | 2 CHOME | xxx | 950 | ... |
|  |  |  |  |  |  |  |  |  |  |  |  |  |  |  | ... |  |  |  |
|  |  |  |  |  |  | ASAHIKAWA CITY | xxx | 201 | — |  |  | 4 JYO | xxx | 701 | 5 CHOME | xxx | 950 | ... |
|  |  |  |  |  |  |  |  |  |  |  |  |  |  |  | 6 CHOME | xxx | 953 |  |
|  |  |  |  |  |  |  |  |  |  |  |  | 5 JYO |  |  | ... |  |  |  |
|  |  |  |  |  |  |  |  |  |  |  |  |  |  |  | 1 CHOME | xxx | 955 | ... |
|  |  |  |  |  |  | ... |  |  |  |  |  |  |  |  | ... |  |  |  |
|  |  |  | MIYAZAKI PREFECTURE | xxx | 102 | NISHI KINE GUN | xxx | 300 | TAKACHIHO CHO | xxx | 550 | OOAZA | xxx | 800 | 1 | xxx | 958 |  |
|  |  |  |  |  |  | ... |  |  | ... |  |  | ... |  |  | ... |  |  |  |
|  |  |  | TOKYO | xxx | 103 | CHUO KU | xxx | 400 | GINZA | xxx | 600 | 1 CHOME | xxx | 900 | 1-1 | xxx | 960 | ... |
|  |  |  |  |  |  |  |  |  |  |  |  |  |  |  | 1-2 | xxx | 961 |  |
|  |  |  |  |  |  |  |  |  |  |  |  |  |  |  | ... |  |  |  |
|  |  |  |  |  |  |  |  |  | TSUKIJI | xxx | 601 | 1 CHOME | xxx | 901 | 1-1 | xxx | 971 |  |
|  |  |  |  |  |  |  |  |  |  |  |  |  |  |  | 1-2 | xxx | 972 |  |
|  |  |  |  |  |  |  |  |  | NIHONBASHI | xxx | 602 | 1 CHOME | xxx | 902 | 1-1 | xxx | 980 |  |
|  |  |  |  |  |  |  |  |  | ... |  |  | ... |  |  | ... |  |  | ... |
|  |  |  |  |  |  | CHIYODA KU | xxx | 401 | KANDA | xxx | 603 | 1 CHOME | xxx | 920 | 1-1 | xxx | 990 | ... |
|  |  |  |  |  |  | ... |  |  | ... |  |  | ... |  |  | ... |  |  | ... |

FIG. 12

| TRANSCRIPTION | PARIS | HARY | ARRY | BARIE | PAILLÉ | PAILLET |
|---|---|---|---|---|---|---|
| PHONETIC SYMBOL | paRi | aRi | aRi | baRi | paje | pajE |

FIG. 13

| TRANSCRIPTION | LYON | MYANS | NYONS | NYON | RILLANS | GUILLON |
|---|---|---|---|---|---|---|
| PHONETIC SYMBOL | ljo~ | mja~ | njo~ | njo~ | Rija~ | gijo~ |

WEIGHT COEFFICIENT GENERATION DEVICE, VOICE RECOGNITION DEVICE, NAVIGATION DEVICE, VEHICLE, WEIGHT COEFFICIENT GENERATION METHOD, AND WEIGHT COEFFICIENT GENERATION PROGRAM

FIELD OF THE INVENTION

The present invention relates to a weight coefficient generation device, a speech recognition device, a vehicle, a weight coefficient generation method, and a weight coefficient generation program for the purpose of improving speech recognition performance of names of places.

Related Art

Conventionally, in car navigation systems, a destination uttered by a driver is recognized, and then a map of the destination with its vicinity is displayed. For example, in Europe, the destinations may be generally identified with countries, cities, streets, and house numbers. Therefore, when the destination in Europe is set utilizing the speech recognition technology relying upon the car navigation system, a country is identified at first, followed by a city by speech recognition of a city name. Subsequently, a street is identified by speech recognition of a street name, with limited vocabulary including street names in the city. After this, a house number is subject to the speech recognition to identify a point of interest of the destination, if necessary. Otherwise, speech recognition of the house number is omitted, and then a typical point on the street is generally set as a point of the destination.

When the speech recognition of cities in France is attempted to utilize such an approach, the number of city names, which are vocabularies to be recognized, is about 50,000, so that the number of vocabularies to be recognized is increased. Moreover, in many cases, since there are city names having similar pronunciations, plural recognition candidates of which speech recognition likelihood value are ranked higher (they are also called as "N-Best") are output on a screen so that a user selects a desired city from among the plural recognition candidates. Herein, the likelihood is a value indicating a probability that a vocabulary to be recognized matches an uttered speech. When a user selects a city, five or so is considered to be desirable as the number of the recognition candidates displayed on one screen. Accordingly, it is desirable that the first to fifth candidates should have high recognition rate. However, in case that there are many similar pronunciations among the city names to be recognized, or in case that the number of vocabularies to be recognized is close to 50,000 words or more, the city name uttered by a user is not listed in the first to fifth candidates by using the existing speech recognition technology. The user is therefore forced to look for the next recognition candidate on another screen (page), thereby, in some cases, notably lacking in convenience.

Specifically, the phonetic transcription of PARIS may be represented as /paRi/, for example, and cities having similar phonetic symbols are shown in FIG. 12.

Further, as another example, the phonetic transcription of LYON may be represented as /ljo~/, for example, and cities having similar phonetic symbols are shown in FIG. 13.

In case that there are many city names having similar phonetic symbols, for some utterance spoken by a speaker, speech recognition likelihood values may not differ from each other. The probability of the existence of the uttered word in the list becomes lower, even by displaying recognition results of the first to fifth candidates. Particularly, this tendency is prominent in the case where a vehicle is traveling at high speed of approximately 100 km/h, driving noises are superimposed onto the uttered speech. This degrades the probability of the existence of the word in the list. This results in deterioration of convenience because the user is forced to turn pages to look for a desired city name from the list.

As a solution to such problems, weighting the recognition result using information other than the speech recognition likelihood is known. For example, Patent Document 1 discloses the technology of weighting the likelihood on the basis of a distance between the current position and the destination when a speech input of the name of the destination is made, so that the larger weighting is given to the likelihood, as the destination is closer from a user's own vehicle (hereinafter, referred to as "likelihood operation").

PRIOR ART DOCUMENTS

Patent Documents

Patent Document 1: JP 2004-117063 A

SUMMARY OF THE INVENTION

Problem to the Solved

It is to be noted that, however, when the destination is distant, applying the technology disclosed in Patent Document 1 can conversely degrade the recognition rate.

Accordingly, when the speech recognition of the destination is conducted on the car navigation device, the improvement of the recognition rate in N-Best is desired by utilizing a method that is not relying upon weighting based on a distance between a user's own vehicle position and the destination.

The present invention has been made in view of the aforesaid problems, and has an object of providing a weighting generation device, a speech recognition device, a navigation device, a vehicle, a weight coefficient generation method, and a weight coefficient generation program for the purpose of improving speech recognition performance of names of places.

Solution to the Problem

To solve the aforesaid problems, according to an aspect of the present invention, there is provided a weight coefficient generation device that takes each of place names stored in an address database for managing address information having a tree structure indicating a hierarchical relationship of the place names, as a vocabulary to be recognized with a speech uttered by a user, and that generates a weight coefficient of likelihood of the vocabulary to be recognized with the speech, the weight coefficient generation device comprising a weight coefficient calculation unit for calculating the weight coefficient of the likelihood of the vocabulary to be recognized, on the basis of an information quantity belonging to a lower hierarchy below the vocabulary to be recognized in the address database.

According to the present invention, since the weight coefficient generation device calculates the weight coefficient of the likelihood of the vocabulary to be recognized on the basis of the information quantity in the address database in the lower hierarchy of the place names of the recognition candidates stored in the address database, a larger weight can be given to the likelihood of the place names of which frequency in use is assumed to be high. This enables the generation of the weight coefficients of the place names for the purpose of improving the speech recognition performance.

In the above weight coefficient generation device, the information quantity in the address database in the lower hierarchy of the vocabulary to be recognized may be the number of the place names in the lower hierarchy of the vocabulary to be recognized.

In the above weight coefficient generation device, the address database may store city names and street names in the lower hierarchy of the city names, and the weight coefficient calculation unit may calculate the weight coefficient of the likelihood of the city names on the basis of the number of the street names in the lower hierarchy of the city names.

In the above weight coefficient generation device, the information quantity in the address database in the lower hierarchy of the vocabulary to be recognized may be the number of facilities in the lower hierarchy of the vocabulary to be recognized.

In the above weight coefficient generation device, the address database may store city names and facility names in the lower hierarchy of the city names, and the weight coefficient calculation unit may calculate the weight coefficient of the likelihood of the city names on the basis of the number of the facility names in the lower hierarchy of the city names.

In the above weight coefficient generation device, the information quantity in the address database in the lower hierarchy of the vocabulary to be recognized may be the number of telephone numbers of the facilities in the lower hierarchy of the vocabulary to be recognized.

In the above weight coefficient generation device, the address database may store the city names or the facility names, and the telephone numbers in the lower hierarchy of the city names or the facility names, and the weight coefficient calculation unit may calculate the weight coefficient of the likelihood of the city names or the facility names on the basis of the number of the telephone numbers in the lower hierarchy of the city names or the facility names.

In the above weight coefficient generation device, the information quantity in the address database in the lower hierarchy of the vocabulary to be recognized may be a used storage capacity in the lower hierarchy of the vocabulary to be recognized.

The above weight coefficient generation device, may further comprise an information quantity output unit for calculating the information quantity in the address database in the lower hierarchy of the vocabulary to be recognized.

According to the present invention, the invention allows improving the speech recognition performance of the city names.

According to another aspect of the present invention, there is provided a speech recognition device recognizing a place name uttered by a user, the device comprising: a speech input unit for allowing the user to input a speech; a speech recognition dictionary in which the place names used for addresses having a hierarchical structure from a wide range to a narrow range; and a recognition result output unit for calculating likelihood of the speech input to the vocabulary to be recognized stored in the speech recognition dictionary, wherein a weight coefficient generated by the above weight coefficient generation device in the speech recognition dictionary, and wherein the recognition result output unit outputs a speech recognition result on the basis of a weighted likelihood weighted by multiplying the weight coefficient by the calculated likelihood.

According to the present invention, since the speech recognition device outputs the speech recognition results based on the weighted likelihood with the number of the place names, the invention allows improvement in the speech recognition performance.

In the above speech recognition device, the recognition result output unit may select a plurality of types of the weighted likelihood each having a high value from among the weighted likelihood, and may display a plurality of vocabularies to be recognized corresponding to each of the selected plurality of the types of weighted likelihood, in order to determine one vocabulary to be recognized by user's selective input.

In the weight coefficient generation device, the recognition result output unit selects plural weighted likelihood with higher rankings from among the weighted likelihood, and displays plural vocabularies to be recognized corresponding to each of the selected plural weighted likelihood, in order to determine one vocabulary to be recognized by a user's selective input.

According to the present invention, since the plural vocabularies to be recognized are displayed as recognition candidates based on the weighted likelihood with the number of the place names, it is possible to improve the probability of including the place name uttered by a user in the plural vocabularies to be recognized. This improves the user's convenience.

According to yet another aspect of the present invention, there is provided a navigation device, map information of an area is identified based on the speech recognition result output from the speech recognition device.

According to the present invention, the navigation device can display the map information of the area that the user desires.

According to further another aspect of the present invention, there is provided a vehicle that installs the above speech recognition device and the above navigation system.

According to the present invention, the user can perform the speech recognition in the vehicle and see the map information of the desired area.

According to further another aspect of the present invention, there is provided a weight coefficient generation method, that takes each of place names stored in an address database for managing address information having a tree structure indicating a hierarchical relationship of the place names, as a vocabulary to be recognized with a speech uttered by a user, and that generates a weight coefficient of likelihood of the vocabulary to be recognized with the speech, the weight coefficient generation method comprising calculating the weight coefficient of the likelihood of the vocabulary to be recognized, on the basis of an information quantity in the address database in a lower hierarchy of the vocabulary to be recognized.

According to further another aspect of the present invention, there is provided a weight coefficient generation program, that takes each of place names stored in an address database for managing address information having a tree structure indicating a hierarchical relationship of the place names, as a vocabulary to be recognized with a speech uttered by a user, and that generates a weight coefficient of likelihood of the vocabulary to be recognized with the speech, the program causing a computer to execute a weight coefficient generation step of calculating the weight coefficient of the likelihood of the vocabulary to be recognized, on the basis of an information quantity in the address database in a lower hierarchy of the vocabulary to be recognized.

According to the present invention, the weight coefficient of the likelihood can be calculated by causing the computer to execute the weight coefficient generation program.

Advantageous Effect of the Invention

According to the present invention, since the weight coefficient generation device has an advantage of calculating the weight coefficient of the likelihood of recognition candidates, and of giving larger weighting to the likelihood of place names having frequency in use assumed to be high, on the basis of the information quantity of the place names belonging to the lower hierarchy below the vocabularies to be recognized in the address database. This enables creating the weight coefficient of the likelihood of the place names for the purpose of improving the speech recognition performance.

BRIEF DESCRIPTION OF THE DRAWINGS

FIG. 3 is a drawing showing data structure of an address database according to the instant embodiment;

FIG. 4 is a drawing showing data structure of the address database according to the instant embodiment;

FIG. 5 is a drawing showing one example of the data structure of a city name recognition dictionary according to the instant embodiment;

FIG. 6 is a drawing showing speech recognition results of the city names each having a large population included in up to the 300th ranking where no likelihood operation is made;

FIG. 7 is drawing showing speech recognition results of city names outside of the first to the 300th ranking where no likelihood operation is made;

FIG. 9 is a drawing showing speech recognition results of city names each having a large population included in up to the 300th ranking where the likelihood operation is made;

FIG. 10 is a drawing showing speech recognition results of city names outside of the first to the 300th ranking where the likelihood operation is made;

FIG. 11 is a drawing showing one example of the address database in which addresses in Japan are stored;

FIG. 12 is a drawing showing one example of cities having phonetic symbols similar to that of Paris; and FIG. 13 is a drawing showing one example of cities having phonetic symbols similar to that of Lyon.

DESCRIPTION OF EMBODIMENTS

Hereinafter, a description will be made to embodiments of the present invention with reference to the accompanying drawings. In the instant embodiment, an explanation will be given to the case where the destination is set as a result of speech recognition of driver's speech to the car navigation system installed in a vehicle, and map information of the area of the destination is displayed.

Figure 1:
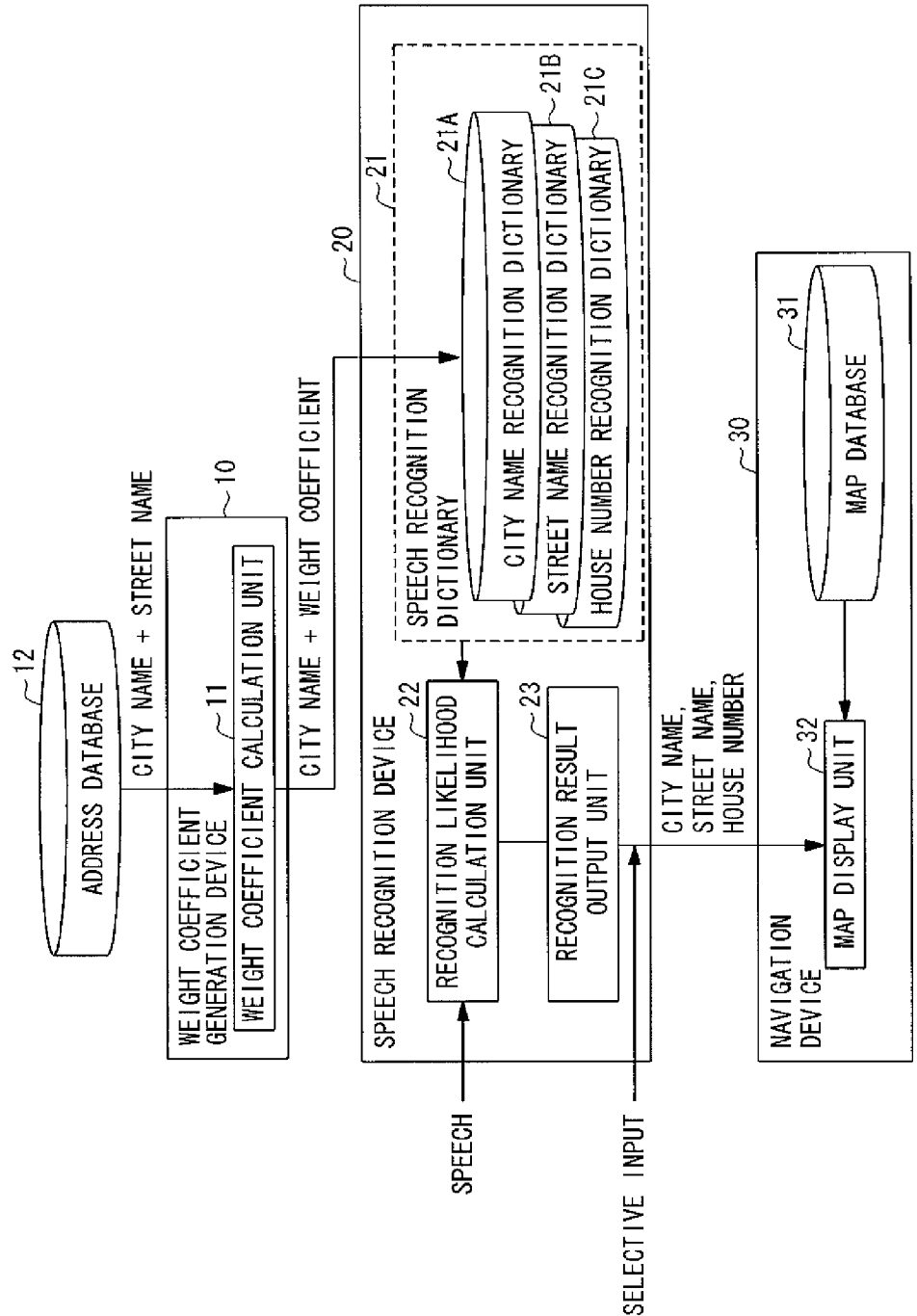
FIG. 1 is a block diagram showing a whole configuration of the car navigation system according to the instant embodiment of the present invention.

FIG. 1 is a block diagram showing the whole configuration of the car navigation system according to the instant embodiment of the present invention. As shown in FIG. 1, the car navigation system includes a weight coefficient generation device 10, a speech recognition device 20, and a navigation device 30.

(Configuration of Weight Coefficient Generation Device)

The weight coefficient generation device 10 includes, as its functional component, a weight coefficient calculation unit 11. This function is implemented by the Central Processing Unit (CPU), not shown, built in the weight coefficient generation device 10 reading out and executing a weight coefficient generation program stored in a memory device, such as a hard disk and a Read Only Memory (ROM).

The weight coefficient calculation unit 11 calculates a weight coefficient of likelihood of vocabulary to be recognized based on the number of the place names belonging to lower hierarchy below the place names of recognition candidates. The likelihood is a value indicating a probability of the vocabulary to be recognized for a speech. Hereupon, the place names that are vocabularies to be recognized and the number of place names belonging to the lower hierarchy below the place names thereof is acquired from an address database 12.

Nevertheless, the weight coefficient of the likelihood of the vocabulary to be recognized should be calculated on the basis of an information quantity belonging to the lower hierarchy below the place names of the recognition candidates in the address database 12. Herein, "the information quantity belonging to the lower hierarchy below the place names of the recognition candidates in the address database 12", include, in concrete terms, the number of facilities belonging to the lower hierarchy below the place names of the recognition candidates, and in addition, the number of telephone numbers linked to the facilities, for example. Moreover, since it is considered that the number of the place names is proportional to storage capacity occupied by them in the address database 12, "the information belonging to the lower hierarchy of the place names of the recognition candidates in the address database 12" may of course be the storage capacity consumed by the place names, facilities, and telephone numbers of the facilities etc. in the address database 12. In other words, "the information quantity in the address database 12" may be anything, as far as it indicates the quantity of information in the lower hierarchy of the place names of the recognition candidates included in the address information in the address database 12.

Moreover, "the information quantity" may be anything, as far as it indicates the quantity of information in the lower hierarchy of the place names of the recognition candidates with certain accuracy. For example, it may be any number found by dividing the number such as place names, the facilities, and the telephone numbers of the facilities, by a given number (an example is "10"), or may be any number found by dividing the used storage capacity in the address database 12 including the place names, the facilities, and the telephone numbers of the facilities, by given storage capacity (an example is "100 Kbytes"). Instead, it may be anything, as far as it is indicated by an index such as "level" representing the information quantity in the lower hierarchy of the place names of the recognition candidates.

FIG. 3 is a drawing showing one example of the data structure of the address information managed in the address database 12. As shown in FIG. 3, the address database 12 has a tree structure indicating hierarchical relationships of the place names ranging from place names in higher hierarchies such as countries and cities, to place names of in lower hierarchies such as house numbers. In the example shown in FIG. 3, the address database 12 manages the address information in France, which stores, in hierarchical relationships of country names, city names, street names, and house numbers.

FIG. 4 is a drawing showing an alternative example of the database structure of the address information managed in the address database 12. In FIG. 4, the address database 12 has a tree structure in hierarchical relationships ranging from place names of wide areas in higher hierarchies such as countries and cities, to place names of narrow areas in lower hierarchies such as facility names and the like. In the example shown in FIG. 4, the address database 12 manages the address information in Japan, which stores in hierarchical relationships of country names, city names, facility genres, and facility names.

In the instant embodiment, in recognizing the city names, likelihood is exploited, to which weighting is given based on the number of the street names of the cities. On this account, the weight coefficient calculation unit 11 counts the number of the street names in the lower hierarchy of each city managed in the address database 12, and calculates the weight coefficient of the likelihood of the city names so that the larger the number of street names, the larger the weighting is given. In the example shown in FIG. 3, although the number of the street names is different from the actual ones, there are four street names in the lower hierarchy of "Paris" and there are three street names in the lower hierarchy of "Marseille". Therefore, the weight coefficient is calculated such that the degree of the weighting of the likelihood of "Paris" becomes larger than that of "Marseille". Further, in the instant embodiment, weighting is given to the likelihood of the cities from the first ranking to the N-th ranking (N is a natural number) in descending order of the number of street names in the lower hierarchy, instead of giving weighting to the likelihood of all the city names. In this case, weighting is defined so that the degree of weighting decreases from the first ranking to the N-th ranking In recognizing the city names, the reason why the likelihood to which weighting is given based on the number of the street names of the city is that the setting frequency of the destination develops a tendency that the more bigger the city is, the more increased number of the street names the big city has, in consideration of the setting frequency of the destinations of a large indefinite number of drivers. Consequently, the street names come to correspond to frequency in use.

Specifically, as a method of acquiring the number of the street names in the lower hierarchy of the city names, the number of the street names in the lower hierarchy of the city names may be stored in the address database 12 to acquire the number of the street names, other than the method of the weight coefficient calculation unit 11 counting the number of the street names in the lower hierarchy of each city name stored in the address database 12.

Figure 2:
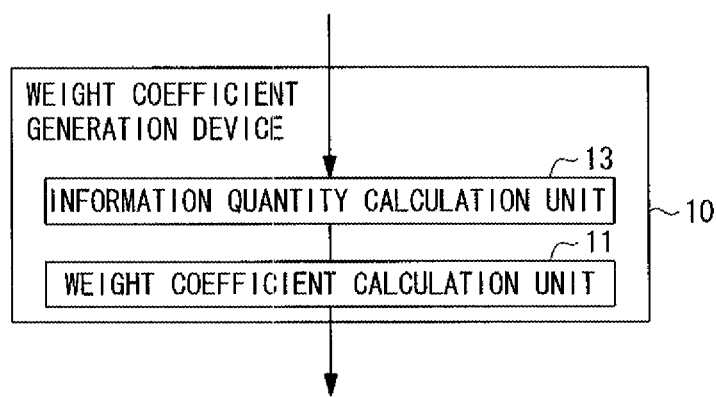
FIG. 2 is a block diagram showing another configuration of a weight coefficient generation device.

In addition, as shown in FIG. 2, the weight coefficient generation device 10 may further include an information quantity calculation unit 13. The information quantity calculation unit 13 calculates the number of the place names in the lower hierarchy of those of the recognition candidates. The calculation method of the number of place names specifically includes those to be described in the following. For example, in a case where the place names in the lower hierarchy of the place names of the recognition candidates are stored and held in hierarchical structure as a database in the memory device such as a hard disk, it is easily possible to acquire the number of place names in the lower hierarchy by utilizing the general function of the database. Further, even in a case where the place names are not held as a database, when they are stored and held in the a memory device such as a hard disk in a data file format permitting reading out in the hierarchical structure, reading data files and hierarchically organizing them enables acquiring the number of place names in the lower hierarchy. In this connection, in a case where the weight coefficient generation device 10 includes the information quantity calculation unit 13, the information coefficient calculation unit 11 acquires the number of place names in the lower hierarchy of the recognition candidates from the information quantity calculation unit 13.

(Configuration of Speech Recognition Device)

A description will next be made to a configuration of the speech recognition device 20. The speech recognition device 20 includes a speech recognition dictionary 21, a recognition likelihood calculation unit 22, and a recognition result output unit 23.

The speech recognition dictionary 21 is a database in a hard disk, not shown, incorporated in the speech recognition device 20 which equip CPU not shown in FIG. 1. The recognition likelihood calculation unit 22 and the recognition result output unit 23 are implemented by executing software such as programs stored in the memory device such as the hard disk and ROM.

The speech recognition dictionary 21 is composed of a city name recognition dictionary 21A, a street name recognition dictionary 21B, and a house number recognition dictionary 21C.

FIG. 5 is a drawing showing one example of the data structure of the city name recognition dictionary 21A. Character data for display, a place name ID, a phonetic symbol, a phoneme model for speech recognition, and a weight coefficient generated by the weight coefficient generation device 10 are stored in association with one another in the city name recognition dictionary 21A for each of the city names managed by the address database 12. As a phoneme model, phoneme Hidden Markov Model (HMM) may be adopted, for example.

The place name ID, the character data for display, the phonetic symbol, and the phoneme model for speech recognition are stored in association with one another in the street name recognition dictionary 21B and the house number recognition dictionary 21C for each of the street names or each of the house numbers managed in the address database 12. In the instant embodiment, because weighing is not given to the likelihood of the house numbers and the street names, the street name recognition dictionary 21B and the house number recognition dictionary 21C do not store the weight coefficients.

The recognition likelihood calculation unit 22 extracts features from a speech input of the place names uttered by a driver input via a microphone, not shown, and calculates the likelihood of the place names that are vocabularies to be recognized stored in the speech recognition dictionary 21, by comparing the extracted features with corresponding features of the phoneme model of the place names that are vocabularies to be recognized stored in the speech recognition dictionary 21.

Additionally, in a case where the place names that are vocabularies to be recognized are the city names, the recognition likelihood calculation unit 22 gives weighting to the likelihood of the city names calculated in the above, by making use of the weight coefficient calculated by the weight coefficient generation device 10 and stored in the city name recognition dictionary 21A.

The recognition result output unit 23 outputs speech recognition results on the basis of the weighted likelihood calculated by the recognition likelihood calculation unit 22. In the instant embodiment, N-Best is displayed on a screen as the speech recognition results. Namely, the recognition result output unit 23 selects plural weighted likelihood with higher values from among the weighted likelihoods of the plural recognized vocabularies calculated by the recognition likelihood calculation unit 22, and displays the plural recognized vocabularies, each corresponding to each of the selected plural weighted likelihood, as recognition candidates on a screen. Then, by prompting a driver to select and input any of place names from N-Best, the speech recognition results are narrowed down to one place name. In this manner, the speech recognition of the city names, the street names, and house numbers are sequentially carried out. When respective place names are narrowed down to one, the recognition result output unit 23 outputs the place name IDs of these place names to the navigation device 30. Additionally, it is conceivable that only the place name of the recognition candidate with the highest likelihood is output, as a recognition result, other than displaying N-Best on the screen as a result of the speech recognition.

(Configuration of Navigation Device)

A description will next be made to the configuration of the navigation device 30. The navigation device 30 includes a map database 31 and a map display unit 32. The map database 31 is a database in the hard disk, not shown, built in the navigation device 30. The map display unit 32 is implemented by the CPU, not shown, reading and executing programs stored in the memory device such as the hard disk and ROM.

Image data to display a map, the character data for display, and the place name IDs are stored in the map database 31 in association with one another.

Upon receipt from the speech recognition device 20 the place name IDs, each indicating the city name, the street name, and the housing number, the map display unit 32 acquires image data to display a map of the area identified by the place name ID for displaying the character data from the map database 31, and displays them on the navigation screen.

EXAMPLE

A description will be made to speech recognition performance in the case where the likelihood operation according to the aforementioned present invention is conducted, and in the case where it is not. First of all, an explanation is given to the latter case, i.e., the likelihood operation is not carried out.

The city names in France are sorted out in the order of the population of the city, and all the city names within the first to the 300th highest ranking each having a large population are uttered. At the onset, the noises induced by a vehicle traveling at 100 km/h are superimposed onto uttered clean speech (noiseless) and then the speech recognition is conducted for the speech onto which the noises are superimposed. Average recognition rate in this situation are shown in FIG. 6. As shown in FIG. 6, the recognition rate of a first candidate is 68.9%, the recognition rate included in up to a second candidate is 76.59%, the recognition rate included in up to a third candidate is 80.94%, the recognition rate included in up to a fourth candidate is 84.28%, and the recognition rate included in up to a fifth candidate is 86.62%. Here, they are called the first candidate, the second candidate, the third candidate, the fourth candidate, and the fifth candidate, in the order of the recognition candidates from the highest likelihood.

Thus, when the city names displayable on one screen as the recognition results are extended to the fifth candidate, the probability that a city uttered by a user can be confirmed on one screen is about 87%, leading to be falling below 90%.

FIG. 7 shows average recognition rate of the city names except for those with the first to 300th ranking where no likelihood operation is given. The number of the uttered city names is 1023. As shown in FIG. 7, the recognition rate of the first candidate is 76.25%, the recognition rate included in up to the second candidate is 84.07%, the recognition rate included in up to the third candidate is 87.59%, the recognition rate included in up to the fourth candidate is 90.03%, and the recognition rate included in up to the fifth candidate is 91.01%.

Figure 8:
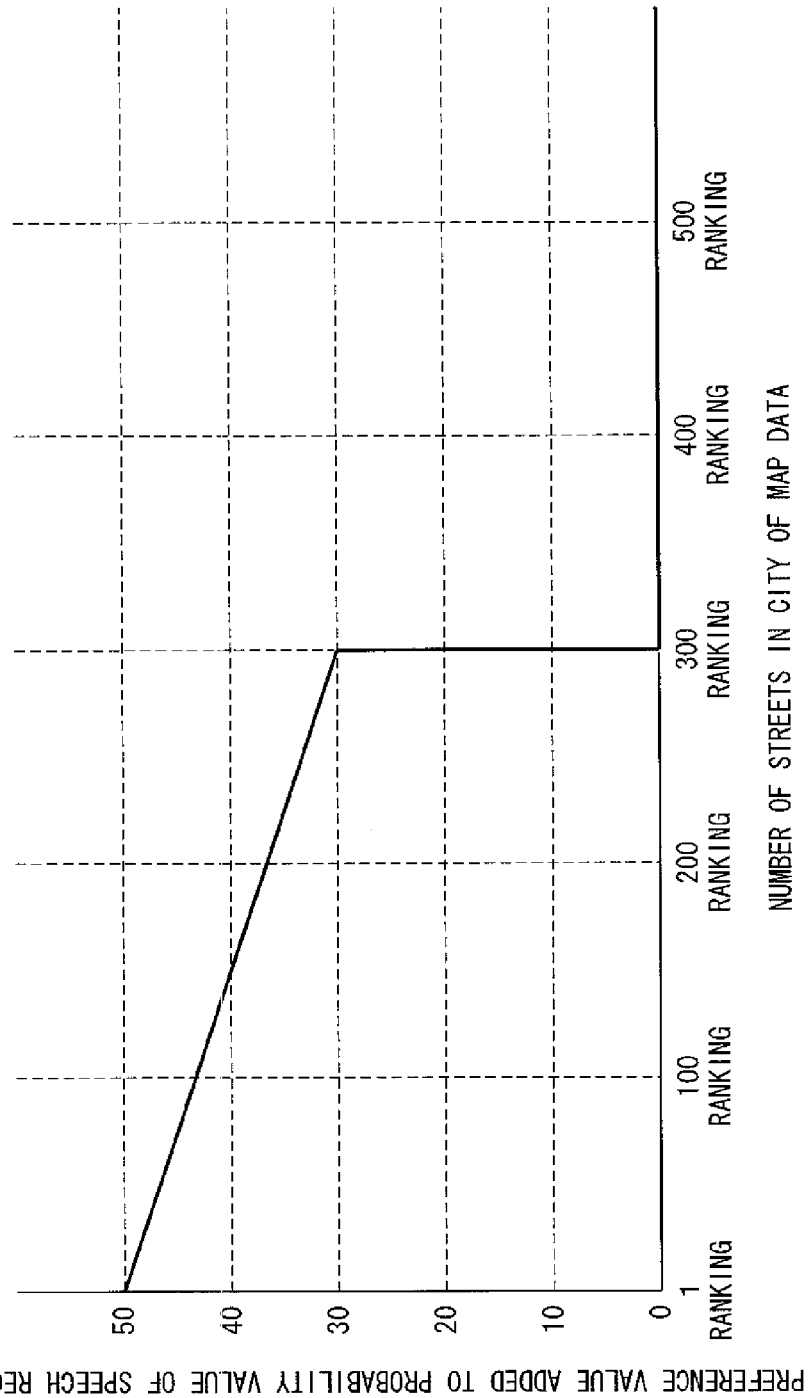
FIG. 8 is a graph illustrating a weight coefficient.

Subsequently, a description will be made to the recognition rate where the likelihood operation is given. The city names to be recognized in France are sorted out in the order of the number of street names. Then, speech recognition with a weight coefficient $w_s$ is performed for cumulative likelihood $P_i$ of the speech recognition of a certain city i, based on the number of the street names. In the speech recognition, in calculating the likelihood of a speech input for each vocabulary to be recognized, the likelihood is calculated for every frame, and the likelihood is accumulated from a start of speech to an end of speech. Then, the vocabularies to be recognized with higher values of the cumulative likelihood in the higher hierarchy are taken as candidates of the recognition results. Hereupon, considering the applications on an embedded system, a logarithm of the likelihood (log likelihood) is accumulated for avoiding multiplication. In this case, the weight coefficient $w_s$ is added to $P_i$. As to how to find $w_s$, it needs to adjust according to the speech recognition device 20 to be utilized. In the instant example, however, it is supposed that n(i) is a ranking starting from 1 when sorted out in descending order of the number of the street names of the city i. For example, a weight coefficient $w_{n(i)s}$ of the city i is defined, as follows, so that the larger the number of the street names, the linearly bigger the value. From this, the larger $w_{n(i)s}$ the city has, the more the city is treated preferentially in a stochastic manner. In the instant example, a model is taken into consideration in which from the first ranking to the N-th ranking (N is a natural number) is preferentially treated in descending order of the number of the street names, and a probability of being preferentially treated monotonically and gently decreases from the first ranking to the N-th ranking. FIG. 8 is a graph illustrating a weight coefficient in the instant example.

$$w_{n(i)s} = \Omega_1 - (\Omega_1 - \Omega_N) \times (n(i)-1)/(N-1), \text{ where } n(i) < N \text{ is satisfied.}$$

$$w_{n(i)s} = 0, \text{ where } n(i) >= N \text{ is satisfied.}$$

Here, $\Omega_1$ is a preference value given to the first ranking and $\Omega_N$ is a preference value given to the N-th ranking $w_1$ and $w_N$ are different depending on a range that the log likelihood of the speech recognition to be used may take. In the instant example, however, a recognition experiment is conducted using the similar speech data as with the case where no likelihood operation is given, on condition that stochastic preference values of the cities ranked by the number of the street names monotonically and gently decrease from the first ranking to 300th ranking, where $\Omega_1$=50, $\Omega_N$=30, and N=300, as shown in FIG. 8. The experimental results are shown in FIG. 9. As shown in FIG. 9, the recognition rate of the first candidate is 83.61%, the recognition rate included in up to the second candidate is 87.63%, the recognition rate included in up to the third candidate is 90.97%, the recognition rate included in up to the fourth candidate is 92.64%, the recognition rate included in up to the fifth candidate is 92.98%.

Further, as comparative recognition results, the recognition rate of the cities exceeding the 300-th ranking are shown in FIG. 10. As shown in FIG. 10, the recognition rate of the first candidate is 73.7%, the recognition rate included in up to the second candidate is 82.7%, the recognition rate included in up to the third candidate is 86.22%, the recognition rate included in up to the fourth candidate is 88.07%, the recognition rate included in up to the fifth candidate is 89.93%.

Consequently, when the $w_{n(i)s}$ of the above model is adapted to the log likelihood of the speech recognition, it is confirmed that the recognition rate of the first candidate is improved by about 14.7% from 68.9% to 83.61%, and the recognition rate included in up to the fifth candidate is improved by about 6.4% from 86.62% to 92.98%.

Meanwhile, although the recognition rate of the cities exceeding 300th ranking is deteriorated in the first candidate by about 2.5% from 76.25% to 73.7%, the deterioration in the recognition rate included in up to the fifth candidate stays at about 1.1% from 91.01% to 89.93%. This is speculated in such a manner that since the recognition rate of N-Best of the speech recognition is usually improved gently as above with respect to the number of candidates, the types of likelihood of the cities exceeding 300th ranking are preferentially treated according to the present invention, with the result that the types of likelihood of the cities being improved. Any of the recognition results fallen within the first to the fifth candidates is expelled out of the first to the fifth candidates as the city originally stays outside of the first to the fifth candidates come to fall within the first to the fifth candidate, thereby deteriorating the recognition rate. That is to say, it is conceivable that the recognition rate is deteriorated in the above example by the amount corresponding to a difference between the fourth candidate and the fifth candidate.

With the examples of the present invention, when the recognition candidates fit to one screen include the first to the fifth candidates, the recognition rate included in up to the fifth embodiment in which the a big city with a high frequency to be set as the destination is improved about 6.4%. The degradation in the recognition rate included in up to the fifth candidate is suppressed to about 1.1% even for the city with a lower frequency to be set as the destination. Such a remarkable validity has been demonstrated as a method of setting a destination in the car navigation system, when a city is identified by using the speech recognition.

As mentioned above, since the weight coefficient generation device 10 calculates the weight coefficient of the likelihood of the city name of the recognition candidate, on the basis of the number of the street names in the lower hierarchy of the city names of the recognition candidates, it is possible to give weighting to the likelihood of the city name assumed to have a high frequency in use. This generates the weight coefficient of the likelihood of the city name for the purpose of improving the speech recognition performance. Accordingly, in setting a city name in the car navigation system, displaying N-Best on one screen based on the weighted likelihood heightens a probability of displaying on one screen the city name uttered by a driver.

In addition to the calculation of the weight coefficient of the city based on the number of the street names, the calculation of the weight coefficient is conceivable based on the population of the city. However, since the number the street names does not frequently increase or decrease unlike the population, calculating the weight coefficient based on the number of street names eliminates the need for frequent recalculation of the weight coefficient, thereby providing high convenience.

In the foregoing embodiments, while the weight coefficient is calculated based on the number of street names in the lower hierarchy of the city, the weight coefficient may be calculated further in consideration of the number of house numbers in the lower hierarchy of the city.

Moreover, the present invention is not necessarily limited to France where the street names become constituent elements of addresses. As far as the address system has a tree structure in hierarchical relationships of the street names from the wide range to the narrow range, the present invention may be applicable to the addresses in Japan including e.g., prefecture, gun, ku, city, town, and aza. One example of the address database in which the addresses in Japan are stored is shown in FIG. 11. Even if the address system in which types of the place names in respective hierarchies are not unified, like the address system in Japan, a high recognition performance is achievable by calculating the weight coefficient given to the likelihood of the recognition candidates based on the number of the place names to the end in the lower hierarchy of the place names of the recognition candidates. For instance, as to the place names in the second hierarchy shown in FIG. 11, the weight coefficient given to the likelihood of the recognition candidates should be calculated based on the place names in the third to the fifth hierarchies of the place names.

Furthermore, the weight coefficient corresponding to each city generated beforehand by the weight coefficient generation device 10 is stored in the city name recognition dictionary 21A. Installing in a vehicle the speech recognition device 20 and the navigation device 30 achieves the speech recognition with a high performance based on the likelihood operation, without installing in the vehicle the weight coefficient generation device 10 or the address database 12.

Reference Signs List

10: weight coefficient generation device
11: weight coefficient calculation unit
12: address database
13: information quantity calculation unit
20: speech recognition device
21: speech recognition dictionary
21A: city name recognition dictionary
21B: street name recognition dictionary
21C: house number recognition dictionary
22: recognition likelihood calculation unit
23: recognition result output unit
30: navigation device
31: map database
32: map display unit

What is claimed is:

1. A speech recognition device comprising:
a speech recognition dictionary in which a place name for use in an address having a hierarchical structure from a wide area to a narrow area is registered as a vocabulary to be recognized;
a recognition likelihood calculation unit for extracting features from a speech, and calculating likelihood of the speech to each of the vocabularies, to be recognized, registered in the speech recognition dictionary based upon the features;
an address database in which a tree structure indicating a hierarchical relationship of the place names of the vocabularies to be recognized;
a weight coefficient calculation unit for calculating a weight coefficient of likelihood of the vocabulary to be recognized based on a number of geographic names belonging to a hierarchy lower than the vocabulary to be recognized, as the number of geographic names becomes larger, the weight coefficient becomes larger; and
a recognition result output unit for outputting a speech recognition result based on weighted likelihood obtained by weighting the likelihood of the speech calculated by the recognition likelihood calculation unit with the weight coefficient of the likelihood of the vocabulary to be recognized calculated by the weight coefficient calculation unit.

2. The speech recognition device according to claim 1, wherein:
the address database stores city names and street names belonging to a lower hierarchy below the city names, and
the number of geographic names belonging to the hierarchy lower than the vocabulary to be recognized in the address database is a number of the street names belonging to the lower hierarchy below the city names.

3. The speech recognition device according to claim 1, wherein:
the address database stores city names and facility names belonging to a lower hierarchy below the city names, and
the number of geographic names belonging to the hierarchy lower than the vocabulary to be recognized in the address database is a number of the facility names belonging to the lower hierarchy below the city names.

4. The speech recognition device according to claim 1, wherein:
the address database stores city names and facility names belonging to a lower hierarchy below the city names, and
the number of geographic names belonging to the hierarchy lower than the vocabulary to be recognized in the address database is a number of telephone numbers of the facility names belonging to the lower hierarchy below the city names.

* * * * *